(12) United States Patent
Kowalewski et al.

(10) Patent No.: US 9,008,596 B2
(45) Date of Patent: Apr. 14, 2015

(54) METHOD FOR REGULATING THE TRANSMISSION POWER OF A TRANSMITTING STATION, AND TRANSMITTING STATION

(75) Inventors: Frank Kowalewski, Göttingen (DE); Siegfried Baer, Pforzheim (DE)

(73) Assignee: IPCOM GmbH & Co. KG, Pullach (DE)

( * ) Notice: Subject to any disclaimer, the term of this patent is extended or adjusted under 35 U.S.C. 154(b) by 974 days.

(21) Appl. No.: 12/410,870

(22) Filed: Mar. 25, 2009

(65) Prior Publication Data

US 2009/0197548 A1    Aug. 6, 2009

Related U.S. Application Data

(63) Continuation of application No. 10/276,834, filed as application No. PCT/DE01/01028 on Mar. 17, 2001, now abandoned.

(30) Foreign Application Priority Data

May 20, 2000    (DE) .................................. 100 25 041

(51) Int. Cl.
*H01Q 11/12*    (2006.01)
*H04B 1/04*    (2006.01)
(Continued)

(52) U.S. Cl.
CPC .......... *H04W 52/362* (2013.01); *H04W 52/225* (2013.01)

(58) Field of Classification Search
CPC .................................................. H04W 52/225

USPC .......... 455/127.1, 127.2, 127.5, 115.1, 115.3, 455/13.4, 69

See application file for complete search history.

(56) References Cited

U.S. PATENT DOCUMENTS

| 5,933,782 | A | | 8/1999 | Nakano et al. | |
|---|---|---|---|---|---|
| 6,166,598 | A | * | 12/2000 | Schlueter | ...................... 330/127 |
| 6,341,224 | B1 | * | 1/2002 | Dohi et al. | ..................... 455/522 |

FOREIGN PATENT DOCUMENTS

| DE | 19821519 A1 | 11/1999 |
|---|---|---|
| DE | 19958383 A1 | 6/2001 |
| EP | 0682417 A2 | 11/1995 |

(Continued)

OTHER PUBLICATIONS

3G TS 25 214 v3.0.0—3rd Generation Partnership Project (3GPP); Technical Specification Group Radio Access Network Physical layer procedures (FDD) (3G TS 25.214 version 3.0.0) (1999).

(Continued)

*Primary Examiner* — Eugene Yun
(74) *Attorney, Agent, or Firm* — Nelson Mullins Riley & Scarborough LLP

(57) ABSTRACT

For regulating a transmission power in a transmission channel of a transmission from a transmitting station in a transmission system, a transmit power command is received from a transmission receiving station, the transmission power in the transmission channel is changed on a basis of the received transmit power command, and an amount of the change in the transmission power at the transmitting station is determined by determining a ratio between a current transmission power and an average over time of the transmission power, such that the amount of the change is dependent on a value of the ratio, with the amount of change increasing as the value of the ratio increases.

4 Claims, 2 Drawing Sheets

(51) Int. Cl.
*H04W 52/36* (2009.01)
*H04W 52/22* (2009.01)

(56) References Cited

FOREIGN PATENT DOCUMENTS

| EP | 0926842 | A2 | 6/1999 |
| WO | 96/31014 | A1 | 10/1996 |
| WO | 97/26716 | A2 | 7/1997 |

OTHER PUBLICATIONS

3G TS 25.215 v3.0.0—3rd Generation Partnership Project; Technical Specification Group Radio Access Network; Physical layer—Measurements (FDD) (3G TS 25.215 version 3.0.0) (1999).

* cited by examiner

METHOD FOR REGULATING THE TRANSMISSION POWER OF A TRANSMITTING STATION, AND TRANSMITTING STATION

CROSS-REFERENCE TO RELATED APPLICATION

This application is a continuation of U.S. patent application Ser. No. 10/276,834, filed on Nov. 19, 2002, which is the National Stage of International Application No. PCT/DE01/01028, filed on Mar. 17, 2001. The subject matter of the aforesaid U.S. patent application is explicitly incorporated herein by reference thereof.

The invention described and claimed hereinbelow is also described in German Patent Application DE 100 25 041.6 filed on May 20, 2000. This German Patent Application, whose subject matter is incorporated here by reference, provides the basis for a claim of priority of invention under 35 U.S.C. 119(a)-(d).

BACKGROUND OF THE INVENTION

The present invention relates to a method for regulating a transmission power of a transmitting station, and to a corresponding transmitting station.

From German Patent Application 199 58 383.8, which had not yet been published by the priority date of the present application, a method for regulating the transmission power of a transmitting station in a transmission system as a function of an estimate of the signal/interference ratio in a receiving station is known in which the transmission power in the transmitting station is changed on the basis of an instruction from the receiving station.

SUMMARY OF THE INVENTION

The method according to the invention for regulating the transmission power of a transmitting station, and the transmitting station according to the invention, have the advantage over the prior art that the amount of the change in the transmission power is adjusted as a function of a power ratio between the current transmission power and an average over time in the transmission power, such that when the value of the power ratio is increasing, the amount of the change in the transmission power is also raised.

In this way, the transmission power can be adapted faster and more precisely to the properties of the transmission channels of the transmission system. The deviation in the signal/interference ratio, measured in the receiving station, from a specified target value can thus be kept as slight as possible. At relatively high speeds between the transmitting station and the receiving station, it is thus possible above to compensate for rapid, deep attenuation incursions on a transmission channel between the two stations. Errors in transmission are thus reduced.

Another advantage is that to perform the method of the invention, changes are needed in a conventional transmitting station on to the extent that an evaluation unit is provided, which by the method of the invention changes the transmission power of the transmitting station as a function of the instruction received from the receiving station. No modification of the receiving station is needed for performing the method of the invention.

It is especially advantageous that the relationship between the power ratio and the amount of the change in the transmission power is selected to be nonlinear. In this way, rapid, deep attenuation incursions in the transmission of signals from the transmitting station to the receiving station can be compensated for even faster, because the transmission power of the transmitting station can be readjusted even faster. The deviation of the estimated signal/interference ratio from the specified target value can thus be kept even smaller.

One exemplary embodiment of the invention is shown in the drawing and explained in further detail in the ensuing description.

DESCRIPTION OF THE PREFERRED EMBODIMENTS

In mobile radio systems, and especially in transmission systems with CDMA (code division multiple access), power control is an important factor. In the transmission power, a compromise must be made between the transmission quality and interfering with other subscribers. The higher the transmission power, the better the transmission quality; and the lower the transmission power, the less are other subscribers interfered with. It must also be remembered that a mobile station is generally battery-operated. The operating time is thus dependent on the power consumption and hence also on the transmission power of the mobile station.

Especially in CDMA transmission systems that are interference-limited, as is the case with the UMTS (Universal Mobile Telecommunications System), the system capacity, which can be expressed as the number of subscribers who are all active at the same time with a specified connection quality, is dependent on regulating the transmission power. The object of regulating the transmission power is, for every mobile radio connection, that is, both for a downlink transmission direction from a base station to a mobile station and for an uplink transmission direction from the mobile station to the base station, to adjust the transmission power individually in such a way that a specified target value $SIR_Z$ in the signal/interference ratio SIR (signal to interference ratio) can be adhered to.

The UMTS will now be addressed as an example. In the UMTS, two different duplex transmission methods across the air interface are provided, as disclosed in the publication entitled "TS 25.201 V3.0.0: Physical Layer—General Description", 3GPPP TSG-RAN-WG1, 1999. These two methods are FDD (frequency division duplex) and TDD (time division duplex). In both, at least for the downlink transmission direction, a closed control loop is provided for regulating the transmission power.

Figure 1:
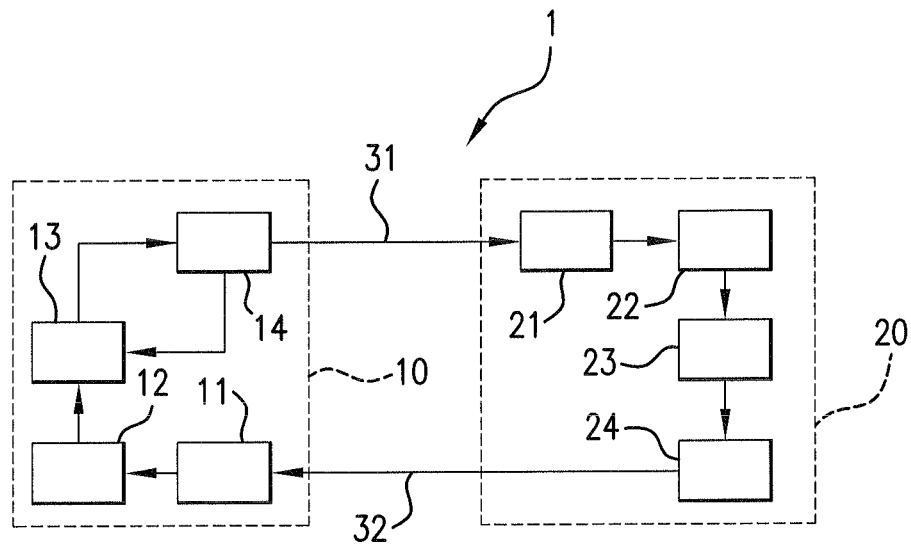
FIG. 1 is a block circuit diagram of power control between a transmitting station and a receiving station.

FIG. 1 shows as an example the block circuit diagram of a closed control loop for regulating the transmission power P in a mobile radio system, such as UMTS. The control loop is identified in FIG. 1 by reference numeral 1. It includes a transmitting station 10 and a receiving station 20. Below, regulating the transmission power P for only the downlink transmission direction will be addressed. In this example, for this purpose the transmitting station 10 is embodied as the base station, and the receiving station 20 is embodied as the mobile station of the UMTS. A downlink transmission channel from the base station 10 to the mobile station 20 is identified in FIG. 1 by reference numeral 31 and an uplink transmission channel from the mobile station 20 to the base station 10 is identified in FIG. 1 by reference numeral 32.

The base station 10 includes a first transmitting unit 14 and a first receiving unit 11. The first receiving unit 11 communicates with the first transmitting unit 14 via a first evaluation unit 12 and a second evaluation unit 13. Other modules of the base station 10, which are unnecessary to comprehension of the invention, are not shown in FIG. 1 for the sake of simplicity. The mobile station 20 includes a second receiving unit 21 and a second transmitting unit 24. An SIR estimator 22 is connected to the second receiving unit 21 and communicates with the second transmitting unit 24 via a third evaluation unit 23. Other modules of the mobile station 20, which are unnecessary to comprehension of the invention, are not shown in FIG. 1 for the sake of simplicity.

The invention will now be described taking the TDD method as an example. The base station 10, via the first transmitting unit 14, sends a signal, at the transmission power P which is constant over a time slot, to the mobile station 20 via the downlink transmission channel 31. This mobile station receives the signal by means of the second receiving unit 21. Next, the SIR estimator 22 ascertains the signal/interference ratio SIR of the transmission. The third evaluation unit 23 performs a comparison of the estimated signal/interference ratio SIR with a specified target value $SIR_Z$ for this ratio and as a function of this comparison generates TPC (transmit power control) instructions for changing the transmission power P of the base station 10. By means of the TPC instructions, the only decision made is whether the transmission power P should be raised or lowered. Via the uplink transmission channel 32, the TPC instructions are forwarded to the base station 10, along with other signals from the second transmitting unit 24.

In the base station 10, the signals and the TPC instructions are received by the first receiving unit 11 and sent on to the first evaluation unit 12. The first evaluation unit 12 extracts the TPC instructions from the signals received. The TPC instructions and the transmission power P currently being used in the first transmitting unit 14 are then sent to the second evaluation unit 13. In the second evaluation unit 13, the amount of the change DeltaP in the transmission power P of the first transmitting unit 14 is then ascertained, in order to adapt the transmission power P adaptively to the current properties of the downlink transmission channel 31.

In the current state of the specifications of the UMTS in the publications entitled "TS 25.214 V3.0.0: Physical Layer Procedures (FDD)", 3GPP TSG-RAN-WG 1, 1999 and "TS 25.215 V3.0.0: Physical Layer Procedures (TDD)", 3GPP TSG-RAN-WG 1, 1999, the change DeltaP in the transmission power P after a TPC instruction is received in the transmitting station 10 is always made by only a predetermined amount, such as 1 dB. This means a nonlinear control, in which the actual deviation in the signal/interference ratio SIR from the power ratio $SIR_Z$ is not taken into account. A decision is merely made whether the transmission power will be raised or lowered by the specified value, such as 1 dB. As a result, it is not possible within only a few time slots in the TDD method, by means of a corresponding increase in the transmission power P of the transmitting station 10, to compensate for rapidly occurring, deep fading incursions of about 20 dB, for instance.

Figure 3:
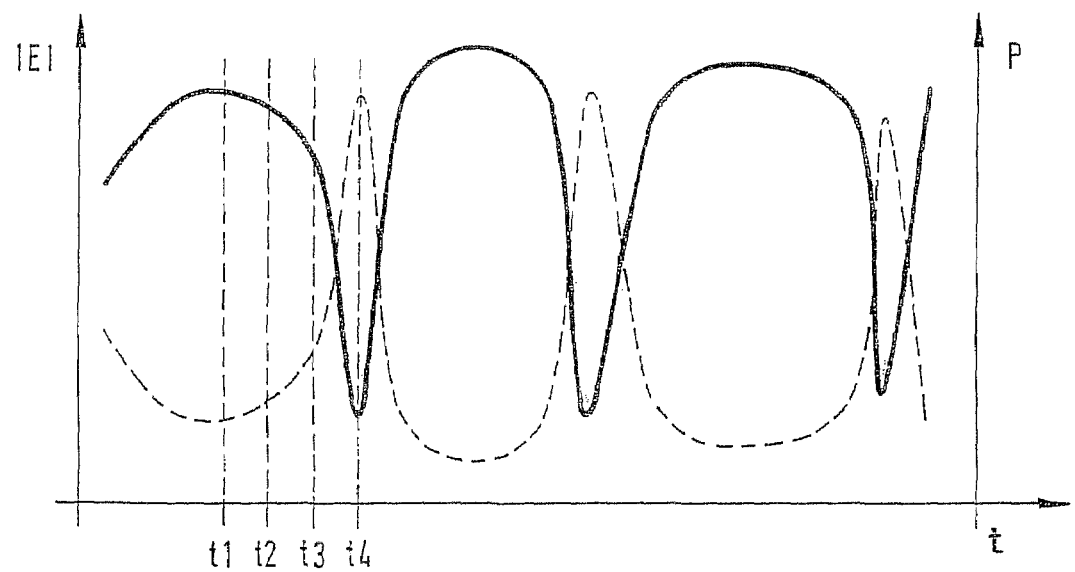
FIG. 3 shows a course overtime of the reception field intensity of the receiving station and the optimal transmission power of the transmitting station.
Figure 4:
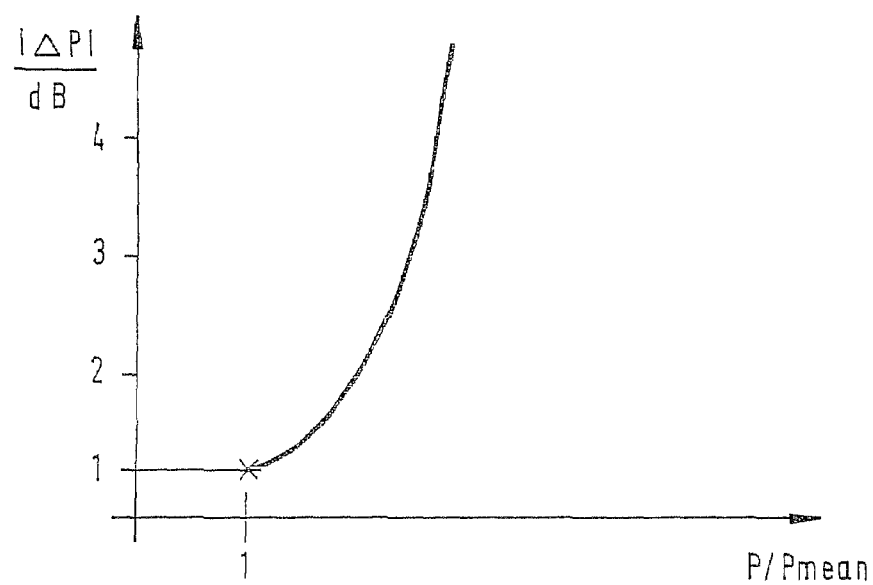
FIG. 4 shows a nonlinear characteristic curve for the change in the amount of the transmission power, referred to a power ratio.

In FIG. 3, as an example, the amount of the reception field intensity E in the second receiving unit 21 is plotted in a solid line over the time t for the situation without power control. This course, with deep incursions, is generally called "fast fading" and is typical of mobile radio channels. The dashed line in FIG. 4 shows the transmission power P theoretically required in the first transmitting unit 14 to obtain a constant signal level, at a constant interference power, in the second receiving unit 21, or in other words to compensate for the effects of fading. The course of the transmission power P over time t is the inverse of the course of the reception field intensity E.

In FIG. 3, a first time t1 is shown at which the transmission power P is low, because the amount of the reception field intensity E is correspondingly high. In the best case, then, a small change DeltaP in the transmission power P, for instance by 1 dB, is needed in order to adapt the signal/interference ratio SIR, which has been measured by the SIR estimator 22, to the power ratio $SIR_Z$. According to the invention, the amount of the change DeltaP in the transmission power P is now to be made greater, if the transmission power P is increasing. An increase in the transmission power P is an indication that an attenuation incursion in the reception field intensity E has occurred and must be compensated for. As FIG. 3 shows, after the first time t1, the requisite transmission power P rises continuously up to a maximum at fourth time t4. In FIG. 3, intermediate values in the transmission power P are found at a second time t2 and a third time t3, and t1<t2<t3<t4, and the requisite transmission power P to compensate for the reception field intensity E becomes greater nonlinearly, with an initially increasing rise. This means that the amount of the change DeltaP must also rise from the first time t1 to the fourth time t4, if the course of the transmission power P shown in FIG. 3 is to be attained and thus if the signal/interference ratio SIR ascertained in the SIR estimator 22 is to be adapted as fast as possible to the signal/interference ratio $SIR_Z$.

Thus it can happen that a change DeltaP in the transmission power P of 2 db, which is greater than the change DeltaP made at the first time t1, must already be made at time t3. At the fourth time t4, it can also be provided that for the change DeltaP in the transmission power P, a value such as 4 db will be selected that is still greater than the change DeltaP selected for the transmission power P at the preceding third time t3.

To enable the fastest possible tracking of the transmission power P to compensate for fading incursions as shown in FIG. 3, the changes DeltaP in the transmission power P must accordingly be selected as still greater, the higher the current transmission power P set at the first transmitting unit 14 is. This can be done for instance by means of a nonlinear characteristic curve as shown in FIG. 4, in which the amount of the change DeltaP in dB is plotted over the transmission power P of the first transmitting unit 14, for example, and the transmission power P is also referred to an average over time Pmean in the transmission power P. The referral of the transmission power P to the average over time Pmean is necessary, because the absolute value of the transmission power P also depends on the distance of the mobile station 20 from the base station 10 and thus is not by itself conclusive as to incursions in the course of the reception field intensity E. The average over time Pmean in the transmission power P is formed from the values for the transmission powers P of preceding time slots in the downlink transmission channel 31 in the first transmitting unit 14.

In FIG. 4, the course of the amount of the change DeltaP in the transmission power P is plotted over the power ratio P/Pmean, formed from the quotient of the transmission power P and the average over time Pmean, in the form of a parabola branch whose apex is at the value pair (1/1). For values of the power ratio P/Pmean of between 0 and 1, a value of 1 db is chosen in FIG. 4 for the amount of the change DeltaP in the transmission power P. However, still other nonlinear relationships between the amount of the change DeltaP in the transmission power P and the power ratio P/Pmean are conceivable. A nonlinear relationship between the amount of the change DeltaP and the power ratio P/Pmean makes especially fast tracking of the signal/interference ratio SIR, estimated in the SIR estimator 22, to the specified target value $SIR_Z$ possible. Nevertheless, a linear relationship between the amount of the change DeltaP and the power ratio P/Pmean, at which then the adaptation of the specified target value $SIR_Z$ in the case of abrupt fading incursions cannot be tracked as fast as it can with a nonlinear relationship, can also be selected.

Figure 2:
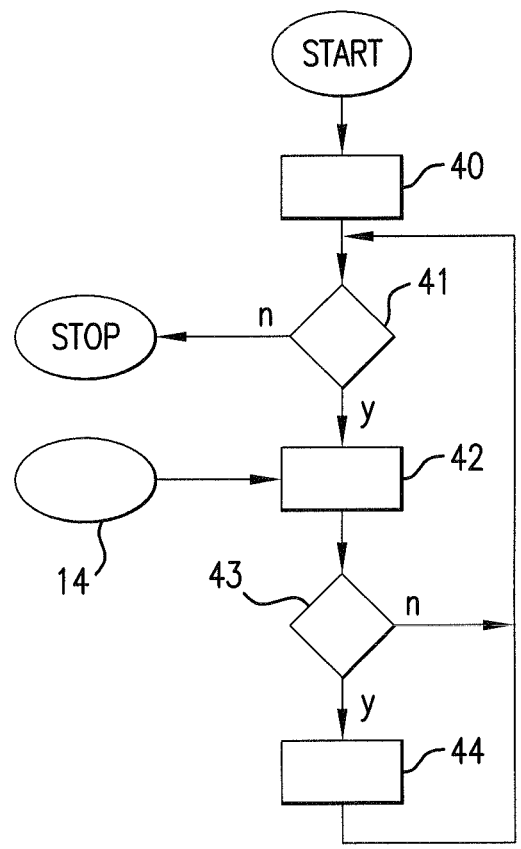
FIG. 2 is a flowchart for the mode of operation of the method of the invention.

The method for regulating the transmission power P will now be explained in conjunction with FIG. 2, using a flowchart. Once a telecommunications connection between the base station 10 and the mobile station 20 has been made, a starting value for the transmission power P and an initial value for an increment size for the change DeltaP in the transmission power P are first ascertained, at a program point 40. This increment size can for instance amount to 1 dB, as shown in FIG. 4. The starting value for the transmission power P and the initial value for the increment size of the change DeltaP in the transmission power P can be selected by the first transmitting unit 14, for example. A jump is then made to program point 41. At program point 41, the first receiving unit 11 checks whether the connection between the base station 10 and the mobile station 20 still exists. One way this can be done is for the first receiving unit 11 to ask whether a disconnection request has been received via the uplink transmission channel 32. If at program point 41 the first receiving unit 11 ascertains that the connection still exists (YES decision), then a jump is made to a program point 42; if not (NO decision), a departure from the program is made. At program point 42, the mean overtime Pmean is formed from the values for the transmission power P from preceding time slots of the downlink transmission channel 31. This averaging is done in the second evaluation unit 13. To that end, the second evaluation unit 13 is also supplied with the current transmission power P from the first transmitting unit 14 of FIG. 1 and FIG. 2. At program point 41, the current transmission power P and the average over time Pmean, ascertained in program point 42, for the power ratio P/Pmean are also formed in the second evaluation unit 13.

As the characteristic curve in FIG. 4 shows, from the ascertained power ratio P/Pmean, the associated amount of the change DeltaP in the transmission power P is determined. Then a jump is made to a program point 43. At program point 43, the second evaluation unit 13 checks whether a TPC instruction was received via the uplink transmission channel 32. If so, a jump is made to a program point 44; if not, a jump is made back to program point 41. At program point 44, the second evaluation unit 13 knows, from the TPC instruction received, that the transmission power P of the first transmitting unit 14 has to be changed, and the received TPC instruction from the second evaluation unit 13 furthermore tells which sign this change has to have. The second evaluation unit 13 at program point 44 thus causes the first transmitting unit 14 to change the transmission power P by the amount of the change DeltaP, ascertained at program point 42, in the transmission power P, and the sign for the change is specified by the TPC instruction received. A jump back to program point 41 is then made.

The method described can naturally also be used to control the transmission power in the uplink transmission direction; in that case, reference numeral 10 would identify the mobile station, and reference numeral 20 would identify the base station.

It can also be provided that the method of power regulation described be used in both the uplink and the downlink directions of transmission, and in this case not only the base station 10 but also the mobile station 20 would have to have the first evaluation unit 12, the second evaluation unit 13, the third evaluation unit 23, and the SIR estimator 22, so that they will be able not only to perform a SIR estimation of the signals received and to generate a corresponding TPC instruction, but also to achieve weighting of TPC instruction received and an adaptation of the transmission power P.

The method of the invention can also be used in an FDD system.

It is also noted that the use of the method of the invention in a UMTS is selected only as an example. The method of the invention can also be used for instance in a GMS (Global System for Mobile Communications) mobile radio network.

It will be understood that each of the elements described above, or two or more together, may also find a useful application in other types of methods and constructions differing from the types described above.

While the invention has been illustrated and described as embodied in a method for regulating the transmission power of a transmitting station, and transmitting station, it is not intended to be limited to the details shown, since various modifications and structural changes may be made without departing in any way from the spirit of the present invention.

Without further analysis, the foregoing will so fully reveal the gist of the present invention that others can, by applying current knowledge, readily adapt it for various applications without omitting features that, from the standpoint of prior art, fairly constitute essential characteristics of the generic or specific aspects of this invention.

What is claimed as new and desired to be protected by Letters Patent is set forth in the appended claims:

1. A method for regulating a transmission power in a transmission channel of a transmission from a transmitting station in a transmission system, the method comprising the steps of
   receiving a transmit power command from a transmission receiving station;
   changing the transmission power in the transmission channel on a basis of the received transmit power command; and
   determining an amount of the change in the transmission power at the transmitting station by determining a ratio between a current transmission power and an average over time of the transmission power, such that the amount of the change is dependent on a value of the ratio, with the amount of change increasing as the value of the ratio increases.

2. The method as defined in claim 1, further comprising selecting a relationship between the ratio and the amount of the change in the transmission power as a nonlinear relationship.

3. A transmitting station for receiving from a receiving station transmit power commands for changing a transmitting station transmission power of transmissions in a transmission channel, the transmitting station comprising an evaluation unit for changing the transmission power of the transmitting station in response to the receipt of the transmit power commands by an amount dependent on a ration of a current transmission power of the transmitting station and an average over time of the transmission power of the transmitting station, with the amount of change increasing as a value of the ratio increases.

4. The transmitting station of claim 3, wherein the evaluation unit is configured so that a relationship between the ratio and the amount of the change in the transmission power is nonlinear.

\* \* \* \* \*